July 15, 1969 W. B. FOULKE 3,455,234
LEAF BALER

Filed Sept. 7, 1967 3 Sheets-Sheet 1

INVENTOR
WILLING B. FOULKE
BY
ATTORNEYS

July 15, 1969  W. B. FOULKE  3,455,234
LEAF BALER
Filed Sept. 7, 1967  3 Sheets-Sheet 2
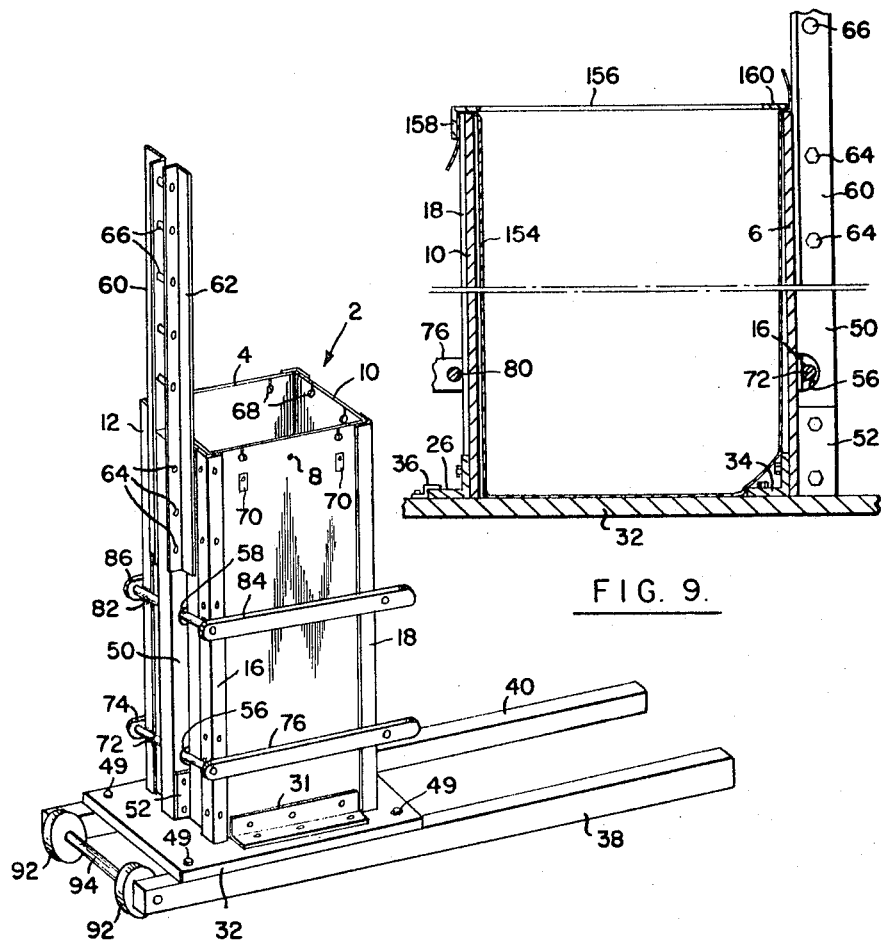
FIG. 9.
FIG. 3.
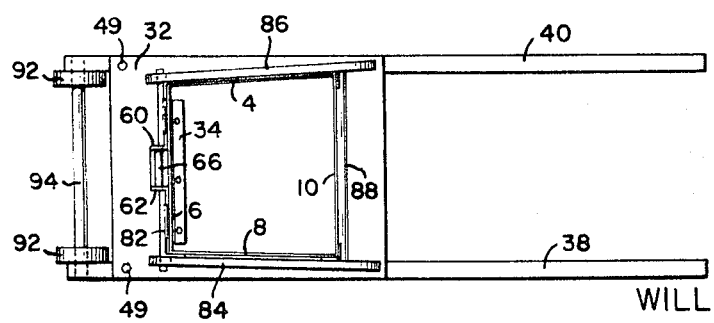
FIG. 4.
INVENTOR
WILLING B. FOULKE
BY
ATTORNEYS

INVENTOR
WILLING B. FOULKE

ATTORNEYS

൹nited States Patent Office 3,455,234
Patented July 15, 1969

3,455,234
LEAF BALER
Willing B. Foulke, 325 N. Bowman Ave.,
Merion Station, Pa. 19066
Filed Sept. 7, 1967, Ser. No. 666,060
Int. Cl. A01f *13/00, 15/14;* B30b *9/30*
U.S. Cl. 100—34        8 Claims

ABSTRACT OF THE DISCLOSURE

A baling press comprises an open-topped box having a trapezoidal horizontal cross-section. A door constitutes the widest side of the box. A ladder-like fulcrum assembly extends upwardly from the base, and along the side of the box opposite the door, and is fixed to a supporting framework below the box. A pushrod suspended from a lever is arranged to act against a plunger in the box.

Background of the invention

This invention relates to baling presses, and particularly to baling presses of compartively small size of the type suitable for compressing leaves in order to prepare them for storage and future use as mulches or for disposal.

Because of the growing concern over air pollution, many local ordinances have been proposed and passed restricting the disposal of leaves by burning. In many areas, they are presently required to be removed by private contractors and/or by the authorities in the community. Because of this, it is desirable either to render the raked leaves in a suitable condition for removal, or to make some other use of them.

With regard to other uses, it is well-known that various types of leaves are suitable for use as mulches or conversion to compost. Different types of leaves, because they differ in acid content, are suitable for use with different plants. For example, oak leaves, which are highly acidic are well-adapted for use on rhododendrons and azaleas. On the other hand, maple leaves, which are mildly acid may be used where moderate soil acidity is desired. Elm and locust leaves are desirably used where acidity is undesirable, for example, on rose beds and perennial flower beds. Heretofore, it has been difficult to store these different kinds of leaves separately.

Various small baling devices are known, and have been used on cotton, hay, paper waste and the like. Heretofore, various designs for baling devices of the small hand-operated type suitable for home use, have involved constructions such that the apparatus is very susceptible to breakage because of the very great forces involved in the plunger operating mechanism. Furthermore, during operation, plungers in these known baling presses have been susceptible, to tilting within the baling cylinder so that they often become jammed.

Summary of the invention

In accordance with this invention, a very simple, but strong baling press is provided, in which a piston operates under a high degree of mechanical advantage while the very great forces involved in the operation of the lever will be, because of the particular structure of the press, not likely to result in breakage. The entire press may be constructed of relatively light and inexpensive materials.

Although the piston may become tilted within the cylinder, this condition can be easily corrected because of the provision of a connecting rod with a free lower end pivoted to a lever arm.

Removal of a bale of leaves compressed in the apparatus is facilitated by the provision of the bailing cylinder in the form of a box having a trapezoidal horizontal cross-section with a removable door forming its widest side. The principal object of the invention, therefore, is to provide a baling press having a relatively light construction, in which a high degree of compression can be achieved. Other objects will be apparent from the following description read in conjunction with the accompanying drawings.

Brief description of the drawings

FIGURE 3 is a perspective view of the baling press showing the rear of the press provided with a ladder-type fulcrum;

FIGURE 4 is a plan view of the baling press, illustrating the trapezoidal configuration of the baling cylinder;

FIGURE 9 is a vertical section of the baling cylinder showing the arrangement of a polyethylene bag within the cylinder.

Description of the preferred embodiment

Figure 1:
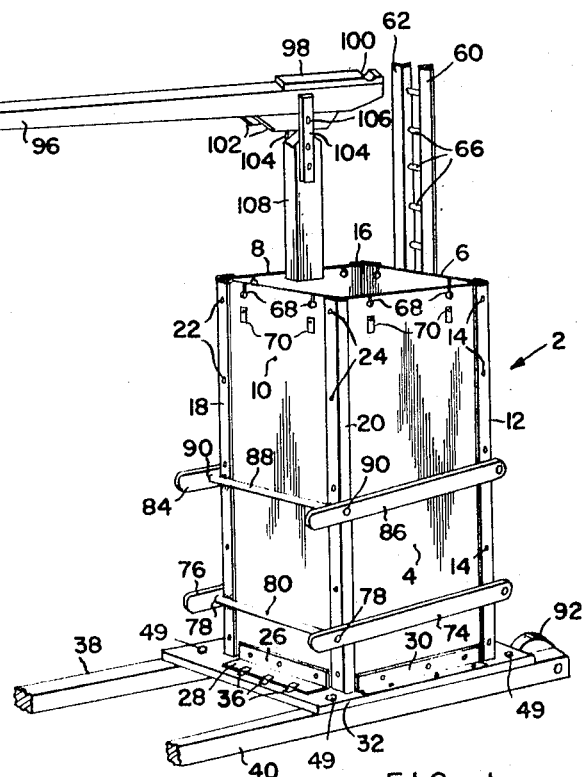
FIGURE 1 is a perspective view of a baling press in accordance with the invention.

Referring to FIGURE 1, a baling cylinder, generally indicated by 2 is shown comprising sides 4, 6 and 8, and a removable door 10. The sides and the door are constructed from plywood, and sides 4 and 6 are held together by an angle iron 12, and by bolts 14. Sides 6 and 8 are similarly held together by angle iron 16.

Door 10 is provided along its vertical edges with angle irons 18 and 20, attached to door 10 by bolts 22 and 24 respectively. Door 10 is further provided along its lower edge with a member 26, from which extends horizontally a flange 28. Sides 4 and 8 are provided along their lower edges with brackets 30 and 31 bolted to base plate 32 in order to support sides 4 and 8 from the base plate. Side 6 is connected to the base plate 32 by an internal bracket 34, shown in FIGURE 4.

Returning to FIGURE 1, a plurality of retaining members 36 are shown fixed to base plate 32, and engaging flange 28 of member 26 in order to support the lower end of door 10 against outward movement.

Figure 5:
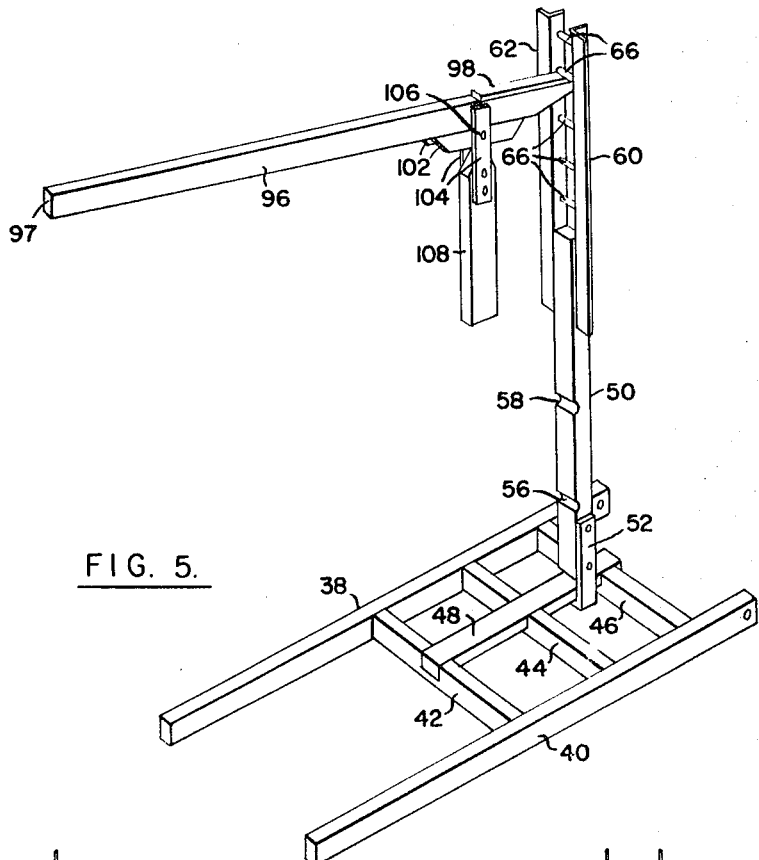
FIGURE 5 is a perspective of the supporting framework of the baling press showing the connection between the ladder-type fulcrum and the framework, and showing the operating lever in an operating position.

Referring to FIGURE 5, a pair of rails 38 and 40 are provided, and are spaced from each other by, but not directly connected to transverse members 42, 44 and 46. Member 48 extends through and is fixed in aligned slots in members 42, 44 and 46. Base plate 32 is secured to members 42, 44, 46 and 48, and these members maintain the base plate in a relatively rigid condition.

Figure 2:
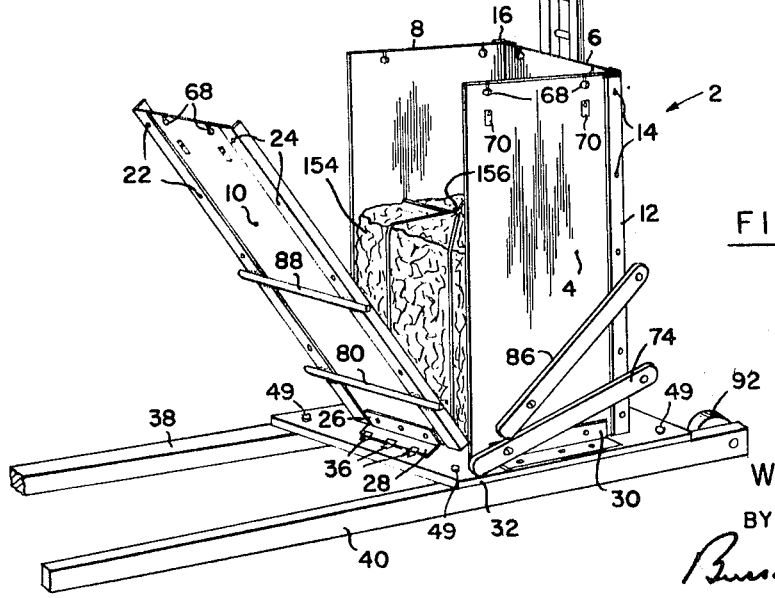
FIGURE 2 is a perspective view of the baling press showing the door partly opened, and showing a compressed and bound bale.

As shown in FIGURES 1, 2, 3, the edges of base plate 32 rest on rails 38 and 40, and bolts 49 maintain the engagement of the edges of the base plate with the rails. A vertical member 50 extends upwardly from base plate 32, and is fastened to member 48 by U-shaped shackle 52 (FIGURE 5). The upwardly extending members of shackle 52 pass through slots provided in base plate 32 and are bolted to member 50. Semicircular horizontal grooves 56 and 58 are provided in member 50. A pair of angle irons 60 and 62 extend upwardly from member 50 on opposite sides, and are secured to member 50 by throughbolts 64 (FIGURE 3). A plurality of horizontal rods 66 is provided between angle irons 60 and 62, these rods being equally spaced from one another and desirably welded in place.

Each of sides 4, 6 and 8 and door 10 are provided with pairs of slots 68, as illustrated in FIGURE 1, and adjacent each slot 68 there is provided a spring clip 70. These slots and spring clips are provided in order to hold binding cords in position during the compression of the bale.

Referring to FIGURES 1, 2, 3 and 4, a first rod 72 extends horizontally along the rear of the baling cylinder, and passes through groove 56 in member 50. Rod 72 is welded to members 12 and 16 and extends beyond the edges of side 6, and is provided at either end with bars 74 and 76 suitably attached to rod 72 to permit rotation about the axis of rod 72 and to permit the opposite ends of the bars to be moved a small distance away from angle irons 18 and 20. Bars 74 and 76 extend horizontally along opposite sides 4 and 8, and are provided near their ends adjacent the door with holes 78, through which locking rod 80 may pass. Rod 82 passes through groove 58 in member 50, and is welded to members 12 and 16. Bars 84 and 86 extend along sides 8 and 4 respectively, and are suitably attached to rod 82 in the same manner in which bars 74 and 76 are attached to rod 72. Locking rod 88 passes through holes 90 in bars 84 and 86. Rods 80 and 88 are desirably welded to angle irons 18 and 20 on the door so they remain attached to the door. Bars 74, 76, 84 and 86 are preferably fastened somewhat loosely on rods 72 and 82 in order that their ends may be separated from the vertical edges of door 10 so that their holes 78 and 90 can be positioned over the ends of rods 80 and 88.

Referring to FIGURE 4, it will be apparent that the width of wall 6 is less than the width of door 10, and that sides 4 and 8 meet side 6 at obtuse angles so that the horizontal cross-section of the baling cylinder is trapezoidal. Side 6 is preferably smaller in width than door 10, by at least 3% of the width of door 10. It will be apparent from this construction that the completed bale will be tapered so that it may be easily withdrawn in a horizontal direction from the baling cylinder when the door is removed. A pair of wheels 92 are desirably provided on an axle 94 extending between rails 38 and 40 so that the apparatus can be easily moved about using rails 38 and 40 as handles.

Referring to FIGURES 1 and 5, lever 96 is provided with a member 98 having an upwardly facing open groove 100 for engaging rods 66. Members 102 extend downwardly from the lever near one of its ends, and a pair of brackets 104 hang from a pin 106 passing through both of members 102. Pushrod 108 is bolted to brackets 104, and may be positioned either vertically or at other angles with respect to the lever.

Figure 8:
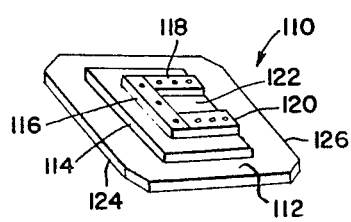
FIGURE 8 is a perspective of a baling plunger.

Referring to FIGURE 8, a plunger 110 is shown comprising plate 112, to which is attached a second smaller plate 114. Members 116, 118 and 120 are attached to plate 114 in order to form a rectangular pocket 122 having an open side. Pocket 122, during normal operation, receives the lower end of pushrod 108, and members 116, 118 and 120 are arranged so that pocket 122 fits the lower end of pushrod 108 closely.

Plunger 110 is desirably provided in the form of a trapezoid with its corners removed, and with side 124 somewhat longer than side 126 so that its shape conforms to that of the cylinder.

Figure 6:
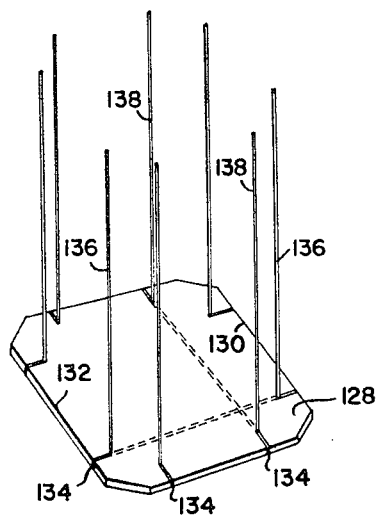
FIGURE 6 is a perspective of a disposable bale support provided with tying cords.

Referring to FIGURE 6, a tying cord support 128 is shown, desirably formed from cardboard, and having an edge 130 somewhat shorter than edge 132 so that it conforms to the cylinder cross-section. A plurality of slots 134 are provided, and each tying cord extends through a first slot, passes underneath the support, and extends through a corresponding slot on the opposite side of the support. Cords 136 and 138 are shown as examples. Support 128 is placed in the bottom of the cylinder before the introduction of leaves, and remains attached to the bale.

Figure 7:
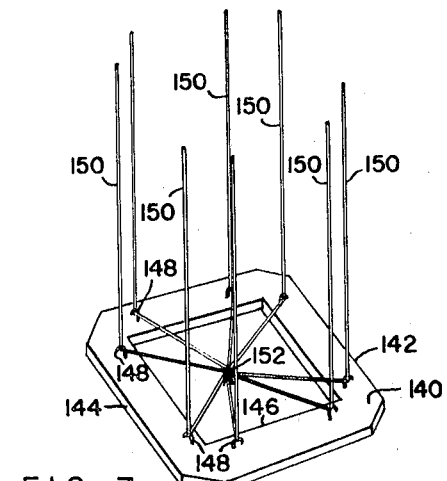
FIGURE 7 is a perspective of a modified bale support.

Referring to FIGURE 7, an alternative support is illustrated, and consists of a wooden member 140 having an edge 142 slightly shorter than edge 144, and provided with a rectangular opening 146. A plurality of screw hooks 148 is provided on its upper surface, hooks 148 being distributed about the upper surface so that tying cords 150 can be positioned properly. Tying cords 150 are knotted together at 152 and pass through individual screw hooks.

Support 140 is placed in the bottom of the cylinder, before leaves are introduced, but does not remain attached to the bale. After the bale is formed, and cords 150 are tied at the top of the bale, the bale is removed from the press and support 140 can be removed by disengaging cords 150 from screw hooks 148 at the lower edge of the bale.

As an alternative to tying the leaf bale with cords, the bale may be compressed into a suitable bag made, for example from a thin sheet of polyethylene such as that indicated in FIGURE 9 as 154. The bag may be made alternatively from jute or impregnated cellulose fiber or from various other suitable materials. The bag is open at its top, and when it is inserted into the baling cylinder, its upper end is folded over the upper edges of the baling cylinder and held in place by a metal ring 156, which conforms to the trapezoidal upper opening of the baling cylinder and rests on the upper edges of the cylinder walls to hold the bag in place. Three sides of ring 156 may be provided with aligning flanges 158. Side 160, which fits over the rear wall 6 of the cylinder does not have an aligning flange. Because ring 156 is trapezoidal and conforms to the shape of the upper opening of the baling cylinder, it cannot slide off the cylinder, but must be lifted off. When the leaves are compressed within the bag, the bag may be removed and tied closed at its upper end.

In the operation of the baler, after door 10 is fastened in place by engaging the ends of rods 80 and 88 with bars 74, 76, 84 and 86, support 128 is lowered to the bottom of the baling cylinder and the tying cords are arranged vertically along the inner walls of the cylinder, passed through slots 68, and held under spring clips 70. The cylinder is then filled with leaves to a level desirably at least half the height of the cylinder, although it may extend completely to the top. Plunger 110 is then placed over the leaves. Assuming that the leaves extend to a level near the top of the baling cylinder, lever 96 is positioned so that groove 100 engages the uppermost rod 66. Pushrod 108 is positioned in pocket 122 of the plunger, and pressure is applied downwardly at a point near end 97 of lever 96. It will be apparent that since lever 96 extends outwardly from the baling cylinder no farther than do elements 38 and 40, the application of pressure to lever 96 cannot result in an upsetting of the apparatus.

When lever 96 has been pushed downwardly through some distance, the leaves in the baling cylinder will be compressed to a smaller volume. Groove 100 is disengaged from the uppermost rod 66 and engaged with the next lower rod 66, a compressing force being again applied near the end of lever 96. It should be noted at this point, that once compressed, leaves have very little tendency to expand, and therefore lever 96 can be freely repositioned without the need for maintaining a downward force on plunger 110 by other means. The process is repeated until groove 100 is engaged with the lowermost of rods 66 and lever 96 is pushed downwardly.

The lever assembly including lever 96 and pushrod 108 is now set aside. Plunger 110 is then removed from the top of the leaf bale and tying cords are removed from spring clips 70 and are tied together, as shown in FIGURE 2, tightly about the leaf bale 154 and knotted at 156. The door is then opened. The bale has a trapezoidal horizontal cross-section conforming to that of the baling cylinder, and can then be removed horizontally from the baling cylinder.

It will be appreciated that, during the compression of the leaves, a very large mechanical advantage can be achieved by compressing the leaves in a series of steps using the ladder-type fulcrum comprising rods 66. Because of this very high mechanical advantage, a very great upward force is imparted to the fulcrum assembly, which would be expected to result in breakage in ordinary baling devices in which the tensile force is applied to a wall of the baling cylinder. The fulcrum assembly in the disclosed apparatus, however is secured, through a vertical member 50 to member 48 of the base framework so that a force in a downward direction applied near the end 97 of lever 96 results in a downward force on the plunger, and a corresponding upward force applied through the base framework and through base plate 32 to the leaf bale. Base plate 32 distributes the downward force applied to it, through it edges to rails 38 and 40 over the entire area of contact between the base plate and the rails rather than only at several small areas or points of contact. This arrangement avoids the possibility of breaking stresses being applied to the cylinder assembly and to other parts of the apparatus. Only lever 96, members 60 and 62, member 50 and the base framework are required to be constructed of such materials as are capable of withstanding the very large forces involved. A bending stress is imparted to the walls of the baling cylinder during compression of the bale, which the walls are capable of withstanding easily.

Forces in a direction tending to open door 10 are accommodated by locking bars 74, 76, 84 and 86. Here again, no tensile forces are applied to the cylinder walls.

If leaves had been introduced to the baling cylinder unevenly, they may tend to cause plunger 110 to become tilted during compression, thus causing it to become jammed within the cylinder. As mentioned previously, pushrod 108 does not have to engage pocket 122 exclusively in order for the press to operate, but may be positioned nearer one of edges 124 and 126 so that further downward movement of pushrod 108 can correct the tilting of plunger 110.

It will be apparent that, with the baling apparatus, bales of different kinds of leaves can be produced and stored together in a storage space, and that the different types of leaves are not likely to become intermingled. Furthermore, since the leaves are compacted, little storage space is necessary. Various chemical substances, either individually or as mixtures may be added to the bales while being compacted in order to produce rapid decomposition and/or to fortify the fertilizing qualities of the mulch or compost. For example, bone meal, gypsum, hydrated lime, ammonium nitrate, phosphoric acid or soluble potash may be used.

It will be apparent that the baler, being light in weight and being provided with rollers, is easily transportable from place to place during the baling of organic material so that it may be taken to the material to be baled thus eliminating the transportation of large quantities of loose material to the baler. The construction is not easily damaged even though very large compacting forces are involved in its operation since no tensile force is applied to the comparatively light weight walls of the baling cylinder.

Because the baling cylinder is provided with a door, and has a trapezoidal horizontal cross-section, the compressed bale is easily removed from the baling apparatus.

Since a leaf bale has very little tendency to expand, after an initial quantity of leaves has been compressed, the plunger can be removed from the baling cylinder and additional leaves may be introduced and compressed. This process can be repeated several times to produce comparatively heavy bales.

It will be apparent that the baling apparatus, because of the simplicity of its construction, can be easily dismantled for storage or shipping.

I claim:

1. A baling press comprising a cylinder, a plunger slidable within said cylinder, means for imparting a downward force to said plunger, a removable spacing member disposed adjacent the bottom of said cylinder and a plurality of hooks attached to and distributed about the periphery of said spacing member, said hooks being adapted to engage binding cords and hold said binding cords against inward movement away from the walls of said cylinder.

2. A baling press comprising a cylinder, a plunger slidable within said cylinder, means for imparting a downward force to said plunger, and a removable, substantially flat spacing member disposed adjacent the bottom of said cylinder, said member having a plurality of inwardly extending slots disposed about its periphery adapted to engage binding cords and hold said binding cords against inward movement away from the walls of said cylinder.

3. A baling press comprising a cylinder, a base plate closing one end of said cylinder, a supporting frame, said base plate resting on said supporting frame, fulcrum means supported by said supporting frame, a plunger slidable in said cylinder, a lever pivoting on said fulcrum means, and a pushrod connectable between said lever and the upwardly facing surface of said plunger in which the improvement comprises pivoting means by which said pushrod is connected to said lever, said pivoting means permitting the end of said pushrod opposite the pivoted end to engage different parts of the upwardly facing surface of said plunger.

4. A baling press according to claim 3 in which the upwardly facing surface of said plunger has mounted thereon centrally located means for receiving the end of said pushrod opposite said pivoting means and for retaining said end in a fixed position with respect to said plunger.

5. A baling press comprising a cylinder, a base plate closing one end of said cylinder, a plunger slidable in said cylinder, fulcrum means, a lever pivoted on said fulcrum means, and a pushrod connectable between said lever and said plunger, in which the improvement comprises a supporting frame including a pair of substantially parallel, elongated members, said base plate extending between and resting on said parallel elongated members, and a third supporting member parallel to and between said elongated members and extending underneath said base plate, and connecting means connecting said fulcrum meas to said third supporting member, said connecting means being disposed throughout its entire length, in parallel relationship to a wall of said cylinder and adjacent the outside of said wall.

6. A baling press according to claim 5 in which said cylinder comprises a plurality of walls and in which one of said walls comprises a removable door.

7. A baling press according to claim 5 in which said fulcrum means includes a plurality of vertically spaced pivots, and in which said lever includes means for selectively engaging a chosen one of said pivots.

8. A baling press according to claim 5 in which said fulcrum means includes a pair of vertical members extending above said cylinder and a plurality of horizontal members extending between and fixed to said vertical members, said horizontal members being vertically spaced, one from another, and said lever including means for selectively engaging a chosen one of said horizontal members.

References Cited

UNITED STATES PATENTS

| | | | |
|---|---|---|---|
| 944,823 | 12/1909 | Rohrer | 100—245 |
| 1,126,073 | 1/1915 | Peterson et al. | 100—228 |
| 1,142,188 | 6/1915 | Macomber | 100—34 |
| 1,220,870 | 3/1917 | Marx | 100—228 |
| 1,250,558 | 12/1917 | Burns | 100—228 XR |
| 2,330,165 | 9/1943 | Wykes. | |
| 2,423,209 | 7/1947 | Storey | 100—293 XR |
| 3,247,782 | 4/1966 | Foster | 100—34 |
| 3,357,346 | 12/1967 | Crafoord | 100—233 XR |

FOREIGN PATENTS 45,228   3/1919   Sweden.

BILLY J. WILHITE, Primary Examiner

U.S. Cl. X.R.

53—124; 100—100, 228, 233, 252, 295